June 23, 1942.　　A. S. BEHRMAN　　2,287,284
APPARATUS AND METHOD FOR TREATING WATER
Filed Aug. 21, 1937　　2 Sheets-Sheet 1
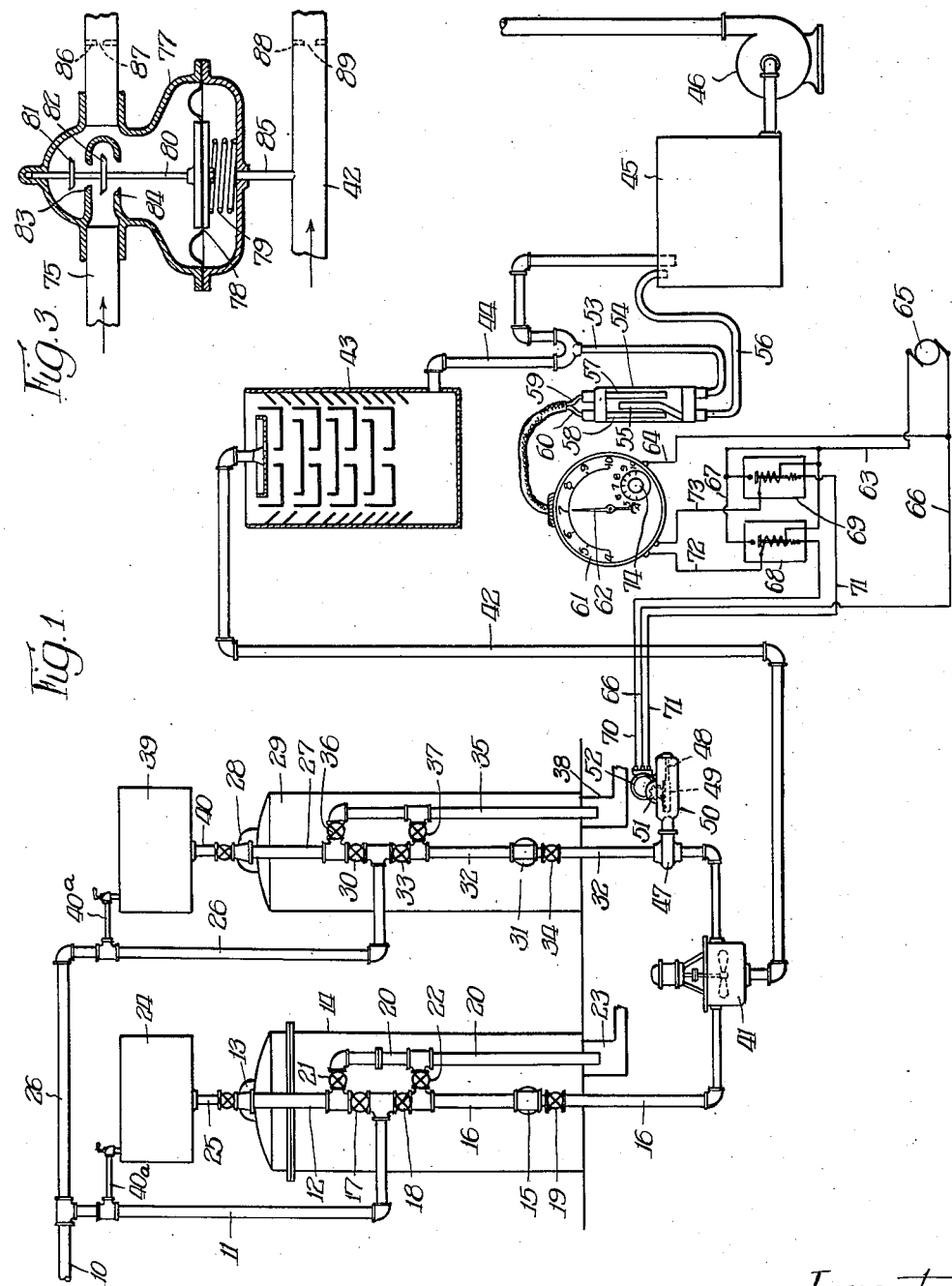
Inventor:
Abraham Sidney Behrman,
By Cromwell, Greist + Warden
attys

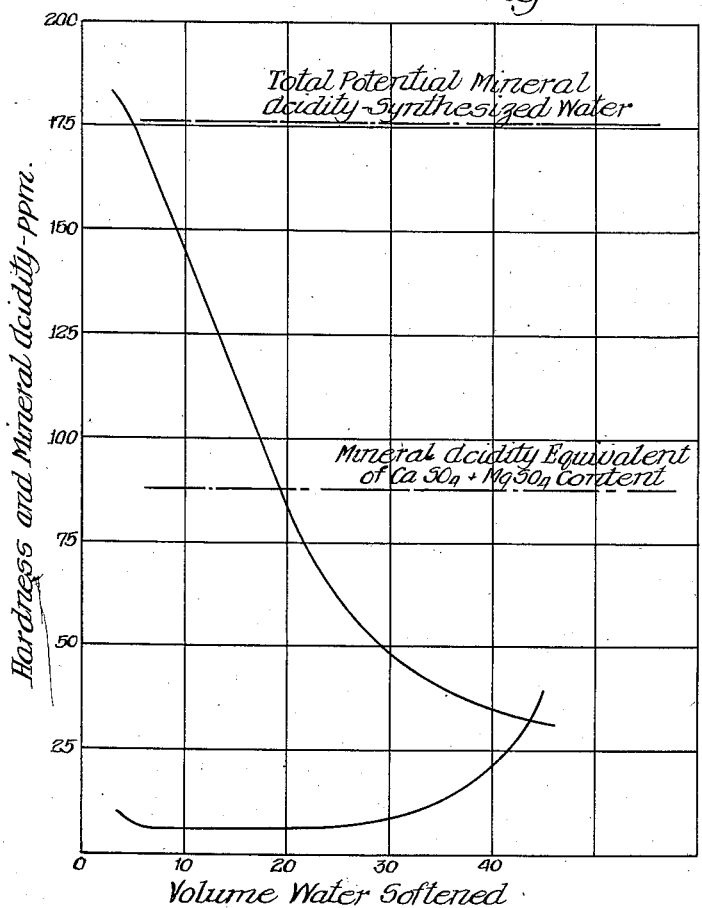

Patented June 23, 1942

2,287,284

UNITED STATES PATENT OFFICE 2,287,284

APPARATUS AND METHOD FOR TREATING WATER

Abraham Sidney Behrman, Chicago, Ill., assignor to Infilco, Inc., Chicago, Ill., a corporation of Delaware Application August 21, 1937, Serial No. 160,219

8 Claims. (Cl. 210—16)

The present invention relates to the treatment of water containing mineral salts with hydrogen exchange zeolites and has as a principal object the provision of an improved process and apparatus for removal of carbonate hardness by hydrogen exchange from a water containing alkaline earth and/or alkali metal bicarbonates in admixture with salts of mineral acids.

An additional object is to provide a process and apparatus for treatment of water containing calcium and magnesium bicarbonates and sulfates and chlorides of sodium to remove carbonate hardness and to provide a substantially neutral water which may be used in boilers and the like, by a hydrogen exchange process in which there is obtained water of constant characteristics by a varying chemical treatment based upon the combined effect of these classes of compounds upon hydrogen exchange materials.

Still another object is the automatic and continuous production of a neutral softened water from a raw water containing carbonate hardness and salts of mineral acids by treatment with hydrogen exchange materials.

A further object is to produce a softened water of controlled pH from a raw water containing carbonate hardness and salts of mineral acids by contacting one stream of the water with a hydrogen exchange material, contacting another stream with an alkali metal exchange material, mixing the two streams together, and reducing the relative volume of the second stream as the process progresses.

Another object is the production of an alkaline water from a raw water containing bicarbonates by treatment with a hydrogen exchange material.

These and other objects will be observed upon consideration of the following description and by reference to the accompanying drawings, in which Fig. 1 is a diagrammatic view of apparatus constructed in accordance with the invention;

Fig. 2 is a fragmentary view of the apparatus including a modified form of the control mechanism;

Fig. 3 is a detail view of a flow responsive control mechanism of the type employed in Fig. 2; and Fig. 4 is a graph showing the relation of mineral acidity and hardness to volume of a particular water treated with a hydrogen zeolite.

Ordinary raw water used for industrial or municipal purposes generally contains dissolved salts of sodium and the alkaline earths. These salts generally are carbonates, bicarbonates, sulfates and chlorides. The bicarbonates of the alkaline earths impart "carbonate hardness" to the water, while the alkaline earth sulfates and chlorides impart "non-carbonate hardness."

By treatment of a water containing carbonate hardness with a hydrogen zeolite, the alkaline earths are exchanged for hydrogen with the formation of carbonic acid which may be removed as by aeration or heating. The behavior of hydrogen zeolites with respect to a water containing mixed salts of this type has led to difficulties which heretofore have retarded the use of hydrogen exchange materials in water treatment. In accordance with the present invention these difficulties are overcome by an improved process and apparatus whereby there is added to the water treated by a hydrogen exchange material a diminishing quantity of a reactant which will restore to the treated water a pH value suitable for boilers and other commercial apparatus and uses.

The hydrogen zeolites vary widely in character as is the case with other zeolites. By treating an ordinary synthetic sodium zeolite with an acid a hydrogen zeolite of substantial capacity is produced. If the zeolite is of the siliceous type the acid must be sufficiently dilute to prevent deleterious action. A desirable type of zeolite to employ is that described in the Halse British Patent No. 7;119 (1902). This material consists of a carbonaceous substance such as sawdust treated with strong sulphuric acid at a temperature of about 150° C. Acid treated lignite or bituminous coal likewise displays hydrogen exchange characteristics of a desirable nature. In general, carbonaceous zeolites have the capacity to resist destruction in the presence of acids, as disclosed in Borrowman Patent No. 1,793,670, and for this reason are particularly desirable when repeated regeneration is desired. For this reason the process and apparatus will be described with particular reference to acid treated carbonaceous zeolites. The specific carbonaceous zeolite may be produced as described in the Halse Patent No. 7,119 referred to above.

In Fig. 4 is a graph showing the results of treatment of a particular midwestern hard water with a hydrogen exchange carbonaceous zeolite. The water treated had an analysis as follows:

| | P. P. M. |
|---|---|
| $Ca(HCO_3)_2$ | 178 |
| $CaSO_4$ | 3 |
| $MgSO_4$ | 103 |
| $Na_2SO_4$ | 126 |
| $NaCl$ | 21 |
| Alkalinity (as $CaCO_3$) | 110 |
| Potential mineral acidity (as $CaCO_3$) | 176 |

With conversion of the various salts to their respective acids, the mineral acidity (which does not include carbonic acid) is approximately 176 P. P. M., as indicated by the top horizontal broken line in Fig. 4. For some reason which I cannot explain definitely, as the process continues and additional water is filtered through the hydrogen exchange material the actual mineral acidity falls below the theoretical, and this fall continues until the material loses its softening capacity. This change in mineral acidity of the treated water occurs progressively even though the softening capacity with respect to the hardness imparting constituents continues unimpaired until the hydrogen zeolite is substantially exhausted. Thus, after 30 volumes of water had been passed through the zeolite the hardness was substantially the same as during the first stages of the use of this particular batch of hydrogen zeolite, while the mineral acidity of the treated water had fallen from 176 P. P. M. to approximately 50 P. P. M.

The lower horizontal broken line indicates the mineral acidity equivalent of the CaSO4 and MgSO4 content of the water, and it will be noted that the mineral acidity of the treated water passes through this line without indication of a critical point.

This peculiar action with respect to mineral acidity results in water of irregular or changing pH and alkalinity, thereby rendering the water unsuitable for most commercial purposes.

In Fig. 1 the supply of raw water to be treated is introduced under pressure through line 10. One branch line 11 leads from line 10 to the upper inlet line 12 which in turn communicates with inlet 13 of a zeolite tank 14 containing a bed of carbonaceous hydrogen exchange zeolite. The water to be treated is passed through the bed of hydrogen exchange material at the desired rate and is removed through the lower outlet line 15, passing from this line through discharge conduit 16, the upper end of the latter being connected to lines 11 and 12, as shown. Line 12 has a valve 17, and line 16 has an upper valve 18 above outlet 15 and a lower valve 19 below the outlet 15.

A regeneration line 20 communicates through valve 21 with line 12 above valve 17, and through valve 22 with line 16 between valve 18 and outlet 15. The lower end of line 20 empties into a waste sump 23.

At the top of the tank 14 is mounted a regeneration tank 24 which empties into tank 14 through valve controlled line 25 and inlet 13.

The second branch line 26 for the raw water extends to a sodium zeolite unit of similar construction to the tank 14. More particularly, an inlet line 27 extends from line 26 to the inlet 28 of a sodium zeolite tank 29 and is controlled by a valve 30. The lower portion of tank 29 has an outlet 31 which is served by a discharge line 32 which also connects at its upper end with line 26. Line 32 has a valve 33 above outlet 31 and another valve 34 below the outlet.

A regeneration line 35 communicates through valve 36 with line 27 above valve 30, and through valve 37 with line 32 below valve 33 and above the outlet 31. The lower end of pipe 35 empties into a waste sump 38.

A regeneration tank 39 is mounted above tank 29 and communicates with the inlet 28 through valve controlled line 40.

Regeneration tanks 24 and 39 may be supplied with water from any source, as through the lines 402 extending from the respective raw water supply lines.

The operation of softeners 14 and 29 is similar. Referring to the hydrogen exchange zeolite softener, the raw water flow is started after valves 17 and 19 are opened and valves 18, 21 and 22 are closed. This allows the raw water to filter through the bed of hydrogen exchange carbonaceous zeolite contained in tank 14 and to pass out of the tank through outlet opening 15 and line 16. After exhaustion or at any desired exchange condition, the carbonaceous zeolite is regenerated by closing valves 17, 18, 19 and 21 and opening valves 22 and line 25. Thereupon the acid contained in tank 24 flows through the carbonaceous zeolite, effecting the desired reconversion to hydrogen zeolite, and passes from outlet opening 15 through the upper branch of line 16, valve 22 and waste line 20 to the sump 23. If it is desired to backwash the zeolite before regeneration, valves 18 and 21 are opened and valves 17, 19 and 22 are closed, the fresh water then flowing upwardly from the outlet 15 through the carbonaceous zeolite and to waste through line 12, valve 21 and line 20.

Where the carbonaceous zeolite is of the nature disclosed in the Halse British Patent No. 7,119 (1902) referred to above, the acid used for regeneration may be of the strength specified therein. The particular acid will, of course, depend upon such factors as the nature of the zeolite and the results desired.

The regeneration of the sodium zeolite in tank 29 is similar to the procedure described with respect to the hydrogen zeolite except that a solution of a sodium salt (e. g. sodium chloride) is employed instead of an acid.

As the raw water initially passes through the hydrogen zeolite substantially all of the calcium, magnesium and sodium is exchanged for hydrogen, with the formation of acids of the respective salts. The sulfates and chlorides form mineral acids, while the carbonates and bicarbonates form carbonic acid.

In passing through the sodium zeolite the chlorides or sulfates of calcium and magnesium are converted to the corresponding salts of sodium and the bicarbonates of calcium and magnesium are changed to the corresponding alkaline reacting salts of sodium.

For most uses it is essential to condition the water from the hydrogen zeolite to prevent the corrosive action of the acids. By mixing the proper amounts of sodium zeolite treated water with the hydrogen zeolite treated water the acids contained in the latter are neutralized by the alkaline reacting sodium salts of the former, with the production of additional carbonic acid.

Thus, by operating in accordance with the process of Green Patent No. 2,082,491, it is possible to remove all of the carbonate hardness imparting constituents of the water as well as alkali metal carbonates or bicarbonates by subsequently removing the carbon dioxide from the water as by aeration.

Due to the nature of the reaction between the raw water and the hydrogen zeolite, there occurs a change in the acidic condition of the treated water upon continuation of the process, as indicated in Fig. 4. The apparatus shown in Fig. 1 conditions the treated water as desired regardless of this change.

The hydrogen zeolite softened water from line 16 is reacted with the sodium zeolite softened water from line 32 in an agitator indicated generally at 41. The resulting water passes through line 42 to an aerating device shown at 43. This device produces a series of cascades as the water passes downwardly, resulting in an effective removal of carbon dioxide from the water. In ordinary operation the aerator should reduce the $CO_2$ content to 10 P. . . M. or less, within which range it is without appreciable effect in the practical working out of the control method and apparatus to be described later.

From the bottom of aerator 43, the water passes through line 44 to a suitable open tank 45, from which it is pumped to storage by pump 46.

The amount of raw water treated in the sodium zeolite tank and mixed with the hydrogen zeolite treated water is changed in accordance with changes in the mineral acidity of the hydrogen zeolite treated water without reference to the $CO_2$ content. In line 32 is positioned a valve 47 which is actuated by a stem 48 having mounted thereon a rack bar 49, the stem being reciprocal in housing 50. A gear 51 meshes with rack bar 49 and is driven by a two-way motor 52, the operation of which determines the position of valve 47 and consequently the amount of sodium zeolite softened water passing through line 32.

A small pipe 53 extends from line 44 to a conventional pH indicating and controlling mechanism indicated at 54. The water, having been substantially freed from carbon dioxide by aeration, rises in the indicator 54 and flows out of it through overflow tap 55, the latter communicating with line 56 and tank 45. A reference calomel electrode 57 and an antimony, glass, or other suitable measuring electrode 58 are positioned in the pH mechanism to be affected by the water. These electrodes are connected through conductors 59 and 60, respectively, to switch device 61 which has a hand 62 operating over a scale expressing the pH of the water numerically.

Switch 61 is provided with a set of conductors 63 and 64 shown on the right side which supply current from source 65 to an internal two-position switch (not shown) of conventional construction. Line 64 also connects with line 66 which joins the common terminal of two-way motor 52. A branch conductor 67 extends from line 63 to the normally open terminals of relays 68 and 69. Line 70 extends from the closed terminal of relay 68 to the upper terminal of motor 52 and line 71 connects the closed terminal of relay 69 with the lower terminal of motor 52.

On the left side of switch 61 are shown conductors 72 and 73 which connect with line 63 and the source of power through the coils of relays 68 and 69, respectively. The set mechanism 74 of switch 61 may be adjusted to operate the switch when the pH of the water rises or falls from pH 7.2 or other value which may be selected. For example, a minimum of pH 7.0 and a maximum of pH 7.4 may be the selected range of operation.

These circuits, which are conventional, operate the reversible motor 52 to position valve 47 in accordance with the pH of treated liquid, thereby admitting to the agitator 41 the proper amount of alkaline water from the sodium zeolite tank to react with the mineral acidity of the hydrogen zeolite treated water.

When the pH of the water falls below 7.2 the two-position switch 61 is operated to complete a circuit from source of power 65 through line 66, line 64, switch 61, line 72, the coil of relay 68, line 63 and back to the source of power, thereby energizing the relay 68 and so closing the switch of the relay. The closing of relay 68 establishes a circuit for motor 52 through the relay which comprises line 66 from the source of power 65 to motor 52, line 70, through closed relay 68, line 67, and back to the source of power. The motor 52 is operated and valve 47 is positioned, through suitable reducing gears, to allow passage of a greater quantity of alkaline, sodium zeolite treated water to enter the agitator 41.

If the pH of the water rises unduly, the two-position switch 61 is reversed in position and a circuit is completed from the source of power 65, through lines 66 and 64, switch 61, line 73, the coil of relay 69, and line 63 back to the source of power, thereby energizing the relay 69 and establishing a circuit to operate the motor 52 in the reverse direction. This circuit established by the closing of relay 69 comprises line 66 from the source of power 65 to motor 52, line 71, through closed relay 69, line 67, and line 63 back to the source of power. The amount of sodium zeolite water is cut down by the resulting restriction of valve 47. It will be understood that relays 68 and 69 operate one at a time.

For boiler use the water may desirably have, for example, an alkalinity of 30 to 50 P. P. M. so that the switch 61 may be set with minimum and maximum points of pH 7.0 and pH 7.4, respectively. A water having an alkalinity of 30 P. P. M. will show a pH of about 6.8 for a free $CO_2$ content of 10 P. P. M., a pH of about 7.0 for 6 P. P. M. free $CO_2$, and a pH of about 7.2 for 4 P. P. M. free $CO_2$. The control range specified, therefore, will be sufficient to provide the desired alkalinity even where there may be an accidental change in the efficiency of $CO_2$ removal.

In the modified form of apparatus shown in Figs. 2 and 3 the apparatus does not provide for $CO_2$ removal before the pH mechanism take-off line and utilizes a proportioning controller for the addition of a predetermined excess quantity of the sodium zeolite treated water to the mixed effluent. Only those parts of the apparatus of Fig. 1 are shown as are necessary for illustration of the change therein. A branch pipe 75 extends from line 32 at a point above the valve 47 to pipe 44 at a point below the pH indicator pipe 53. The mixed effluent line 42 leads directly to line 44 through branch 76, the $CO_2$ aerator thereby being omitted. Between lines 75 and 42 is mounted a proportioning controller 77, the details of which are shown in Fig. 3. Across controller 77 is mounted a flexible diaphragm 78 which is biased toward a normal position by spring 79. A stem 80 extends upwardly from diaphragm 78 to the top of the controller and is free to rise and fall with the diaphragm. An upper valve disc 81 and a lower valve disc 82 are mounted on this stem and are positioned with respect to the corresponding valve seats 83 and 84 upon movement of the stem.

The bottom chamber of controller 77 below diaphragm 78 is provided with a static pressure line 85 which is connected to line 42, so that the diaphragm changes its position in accordance with changes in the pressure in line 42.

On the downstream side of line 75 with respect to the controller is a disc 86 having a central orifice 87 of predetermined size. Pipe 42 likewise has a disc 88 on the downstream side of line 85, and this disc has an orifice 89 of predetermined larger size than orifice 87. Lines 75 and 42 are connected to the common discharge line 53 and the relative amounts of water passing through the respective lines depends upon the pressure in the lines and the sizes of orifices 87 and 89. Changes in pressure in line 42 are translated into movement of diaphragm 78. This movement in turn causes valves 81 and 82 to be positioned so as to equalize the pressure between lines 75 and 42, thereby making the flow through lines 75 and 42 dependent upon the sizes of orifices 87 and 89.

In the modified form of apparatus described, wherein there is no aeration ahead of the pH indicator, the switch 61 is preferably set to control the pH at about 4.4, which corresponds to a methyl orange or total alkalinity of zero; orifices 87 and 89 are of such size as to add a predetermined excess of the effluent from the sodium zeolite treated water to provide any desired alkalinity, such as 30 P. P. M. previously mentioned. Aeration then may follow the final addition of zeolite treated water if the use to which the water is to be put makes this further step desirable.

The nature of water which may be treated in accordance with the invention varies greatly. With some waters, particularly those having a high bicarbonate content, the hydrogen zeolite softening may be continued with effective results to a point at which the effluent from the hydrogen zeolite bed actually is alkaline, in which case, of course, the addition of sodium zeolite treated water becomes unnecessary. In such cases the acidity curve passes through the base line before the hardness curve rises unduly. The continued drop in mineral acidity is accompanied by effective removal of calcium and magnesium as well as bicarbonates. That is, although the mineral acidity decreases, the efficiency of the hydrogen zeolite in removing calcium and magnesium as well as carbonates continues unabated until the zeolite begins to be exhausted. Thus, it is possible to treat a hard water with an acid-forming hydrogen zeolite and to obtain therefrom a softened water which may be quite alkaline. There apparently is a preferential action of the hydrogen zeolite upon the alkaline earth compounds as compared with the alkali metal salts whereby the removal of the former continues to be completely effective until the hydrogen zeolite is substantially exhausted, while the action of the hydrogen zeolite upon the neutral sodium compounds (e. g. the sulfates and chlorides) in the water follows a downwardly sloping curve of the type shown in Fig. 4.

The control of the process will depend somewhat upon the nature of the hydrogen zeolite. For example, in the case of the Halse exchange material, the drop in the mineral acidity curve during the initial stages of the process may be retarded by employing large quantities of acid in the regeneration of the carbonaceous material. Thus, the exact shape and slope of the mineral acidity curve shown in Fig. 4 is not fixed, but may vary in its downward trend depending upon operating factors in the process.

The invention has been described with respect to the use of a sodium zeolite treated water for mixture with the hydrogen zeolite treated water, but other sources of alkaline material may be used instead of or in addition to the sodium zeolite water.

These and other variations in the invention which may be made without departing from the scope thereof are intended to be included in the appended claims.

I claim:

1. The process of treating water containing salts of an alkaline earth and an alkali metal, capable of producing mineral acids by hydrogen exchange, which comprises passing a stream of uniform flow of said water through a hydrogen exchange zeolitic material, passing a second stream of said water through an alkali metal exchange material, mixing said streams, determining the hydrogen ion concentration of the mixed effluent, and controlling the volume of said second stream in accordance with said hydrogen ion concentration determination to produce a substantially constant hydrogen ion concentration as indicated by said determination.

2. The method of producing a softened water from water containing an alkaline earth bicarbonate and an alkali metal salt of a mineral acid, which comprises passing one stream of said water in a uniform flow in contact with a hydrogen exchange carbonaceous material, passing a second stream of said water in contact with an alkali metal zeolite, mixing said streams together, determining the acidity of said mixed water, and reducing the volume of said second stream in accordance with the decreasing acidity of said mixed water.

3. The method of producing a softened water from water containing an alkaline earth bicarbonate and an alkali metal salt of a mineral acid, which comprises passing a stream of said water in a uniform flow through a bed of hydrogen exchange carbonaceous material, thereby producing a softened effluent of diminishing acidity, passing another stream of said water through alkali metal zeolite, and mixing said streams in progressively different proportions to provide a water of predetermined uniform pH.

4. The method of producing a softened water from water containing an alkaline earth bicarbonate and an alkali metal salt of a mineral acid, which comprises passing a stream of water through a bed of a hydrogen exchange material, passing another stream of said water through an alkali metal exchange material, mixing said streams, removing carbon dioxide from the mixed streams, determining the pH of said water after removal of carbon dioxide, and controlling the volume of said other stream of water in accordance with said pH.

5. Apparatus of the type described, comprising a hydrogen exchange tank, a sodium exchange tank, conduits for delivering untreated water to said tanks, a common effluent line for said tanks, means for removing $CO_2$ from the effluent from said tanks, means for measuring the pH of said effluent after removal of $CO_2$, and means responsive to said measuring means for controlling relative volumes of water from said tanks.

6. An apparatus of the type described comprising a hydrogen exchange tank, a sodium exchange tank, means for delivering untreated water to said tanks, a common effluent conduit, conduits for delivering treated water from each tank to said common effluent conduit, means for measuring the pH of the water in the common effluent, and means operated by said measuring means for controlling relative volumes of water from said tanks.

7. The process of treating water containing an alkaline earth bicarbonate and an alkali metal salt of a mineral acid, which comprises progressively passing quantities of said water through a hydrogen zeolite to produce a softened effluent which initially is acid and progressively less acid, continuing the passage of quantities of said water through said zeolite until the effluent therefrom is alkaline and of increased hardness, passing other quantities of said water through an alkali metal zeolite to produce a softened, alkaline effluent, and mixing decreasing quantities of said alkaline effluent with the effluent from said hydrogen zeolite to provide a mixture of relatively constant alkalinity.

8. An apparatus of the type described comprising a hydrogen exchange tank, a sodium exchange tank, means for delivering untreated water to said tanks, a common effluent conduit, conduits for delivering treated water from each tank to said common effluent conduit, means for measuring the pH of the water in the common effluent, means operated by said measuring means for controlling relative volumes of water from said tanks, and means for adding to the water in the effluent line an additional predetermined proportion of the effluent from the sodium exchange tank.

ABRAHAM SIDNEY BEHRMAN.